United States Patent
Merry et al.

(10) Patent No.: US 11,002,195 B2
(45) Date of Patent: May 11, 2021

(54) INTERCOOLED COOLING AIR WITH AUXILIARY COMPRESSOR CONTROL

(71) Applicant: United Technologies Corporation, Farmington, CT (US)

(72) Inventors: Brian D. Merry, Andover, CT (US); Gabriel L. Suciu, Glastonbury, CT (US); Michael G. McCaffrey, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 223 days.

(21) Appl. No.: 16/374,995

(22) Filed: Apr. 4, 2019

(65) Prior Publication Data
US 2020/0025105 A1    Jan. 23, 2020

Related U.S. Application Data

(63) Continuation of application No. 14/967,446, filed on Dec. 14, 2015, now Pat. No. 10,443,508.

(51) Int. Cl.
*F02C 9/18* (2006.01)
*F02C 7/143* (2006.01)
(Continued)

(52) U.S. Cl.
CPC ............. *F02C 9/18* (2013.01); *F01D 17/105* (2013.01); *F01D 25/12* (2013.01); *F02C 7/143* (2013.01);
(Continued)

(58) Field of Classification Search
CPC .. F02C 7/32; F02C 7/36; F04D 29/284; F05D 2220/32; F05D 2220/3212
See application file for complete search history.

(56) References Cited

U.S. PATENT DOCUMENTS 2,692,476 A   10/1954 Schaal et al.
3,878,677 A    4/1975 Colvin
(Continued)

FOREIGN PATENT DOCUMENTS

DE    2852057    6/1979
EP    0447886    9/1991
(Continued)

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.
(Continued)

*Primary Examiner* — Eldon T Brockman
*Assistant Examiner* — Topaz L. Elliott
(74) *Attorney, Agent, or Firm* — Carlson, Gaskey & Olds, P.C.

(57) ABSTRACT

A gas turbine engine includes a main compressor section with a downstream most location. A turbine section has a high pressure turbine. A tap line is connected to tap air from a location upstream of the downstream most location in the main compressor section. The tapped air is connected to a heat exchanger and then to a cooling compressor. The cooling compressor compresses air downstream of the heat exchanger, and is connected to deliver air into the high pressure turbine. A bypass valve is positioned downstream of the main compressor section, and upstream of the heat exchanger. The bypass valve selectively delivers air directly to the cooling compressor without passing through the heat exchanger under certain conditions.

18 Claims, 5 Drawing Sheets

(51) Int. Cl.
  *F02C 7/32* (2006.01)
  *F02C 7/18* (2006.01)
  *F01D 17/10* (2006.01)
  *F01D 25/12* (2006.01)
  *F02C 7/36* (2006.01)
  *F04D 29/28* (2006.01)

(52) U.S. Cl.
  CPC ........... *F02C 7/185* (2013.01); *F02C 7/32* (2013.01); *F02C 7/36* (2013.01); *F04D 29/284* (2013.01); *F05D 2220/32* (2013.01); *F05D 2220/3212* (2013.01); *F05D 2260/211* (2013.01); *F05D 2260/213* (2013.01); *F05D 2260/4031* (2013.01); *F05D 2260/606* (2013.01); *F05D 2270/112* (2013.01); *F05D 2270/335* (2013.01)

(56) References Cited

U.S. PATENT DOCUMENTS

| | | | |
|---|---|---|---|
| 4,254,618 A | 3/1981 | Elovic | |
| 4,539,945 A | 9/1985 | Bosisio | |
| 4,882,902 A | 11/1989 | Reigel et al. | |
| 4,991,394 A | 2/1991 | Wright | |
| 5,056,335 A | 10/1991 | Renninger et al. | |
| 5,269,135 A | 12/1993 | Vermejan et al. | |
| 5,305,616 A | 4/1994 | Coffinberry | |
| 5,317,877 A * | 6/1994 | Stuart | F02C 7/185 60/736 |
| 5,392,614 A | 2/1995 | Coffinberry | |
| 5,414,992 A | 5/1995 | Glickstein | |
| 5,452,573 A | 9/1995 | Glickstein et al. | |
| 5,498,126 A | 3/1996 | Pighetti et al. | |
| 5,724,806 A | 3/1998 | Horner | |
| 5,758,485 A | 6/1998 | Frutschi | |
| 5,867,979 A | 2/1999 | Newton et al. | |
| 5,918,458 A | 7/1999 | Coffinberry et al. | |
| 6,050,079 A | 4/2000 | Durgin et al. | |
| 6,065,282 A | 5/2000 | Fukue et al. | |
| 6,134,880 A | 10/2000 | Yoshinaka | |
| 6,217,280 B1 * | 4/2001 | Little | F01D 5/084 415/115 |
| 6,430,931 B1 | 8/2002 | Horner | |
| 6,487,863 B1 | 12/2002 | Chen et al. | |
| 6,612,114 B1 | 9/2003 | Klingels | |
| 6,892,523 B2 | 5/2005 | Fetescu et al. | |
| 7,143,581 B2 * | 12/2006 | Kobayashi | F02C 7/12 60/728 |
| 7,237,386 B2 | 7/2007 | Hoffmann et al. | |
| 7,246,484 B2 | 7/2007 | Giffin, III et al. | |
| 7,284,377 B2 | 10/2007 | Joshi et al. | |
| 7,306,424 B2 | 12/2007 | Romanov et al. | |
| 7,334,412 B2 | 2/2008 | Tiemann | |
| 7,347,637 B2 | 3/2008 | Kubo et al. | |
| 7,500,365 B2 | 3/2009 | Suciu et al. | |
| 7,552,591 B2 | 6/2009 | Bart et al. | |
| 7,698,884 B2 | 4/2010 | Maguire et al. | |
| 7,765,788 B2 | 8/2010 | Schwarz | |
| 7,823,389 B2 | 11/2010 | Seltzer et al. | |
| 7,882,691 B2 | 2/2011 | Lemmers, Jr. et al. | |
| 7,886,520 B2 | 2/2011 | Stretton et al. | |
| 8,015,828 B2 | 9/2011 | Moniz et al. | |
| 8,037,686 B2 | 10/2011 | Lasker | |
| 8,087,249 B2 | 1/2012 | Ottaviano et al. | |
| 8,181,443 B2 | 5/2012 | Rago | |
| 8,277,170 B2 * | 10/2012 | Hess | F02C 7/185 415/115 |
| 8,307,662 B2 | 11/2012 | Turco | |
| 8,350,398 B2 | 1/2013 | Butt | |
| 8,397,487 B2 | 3/2013 | Sennoun et al. | |
| 8,402,742 B2 | 3/2013 | Roberge et al. | |
| 8,434,997 B2 | 5/2013 | Pinero et al. | |
| 8,511,967 B2 * | 8/2013 | Suciu | F01D 25/18 415/108 |
| 8,516,828 B2 * | 8/2013 | Glahn | F02C 6/08 60/785 |
| 8,522,529 B2 | 9/2013 | Martinou et al. | |
| 8,572,982 B2 | 11/2013 | Tiemann | |
| 8,602,717 B2 | 12/2013 | Suciu et al. | |
| 8,621,871 B2 | 1/2014 | McCune et al. | |
| 8,727,703 B2 | 5/2014 | Laurello et al. | |
| 8,776,952 B2 | 7/2014 | Schwarz et al. | |
| 8,814,502 B2 | 8/2014 | Eleftheriou | |
| 8,826,675 B2 | 9/2014 | Rodriguez et al. | |
| 8,876,465 B2 | 11/2014 | Stretton | |
| 8,961,108 B2 | 2/2015 | Bergman et al. | |
| 9,234,481 B2 | 1/2016 | Suciu et al. | |
| 9,243,563 B2 | 1/2016 | Lo | |
| 9,255,492 B2 | 2/2016 | Bacic | |
| 9,297,391 B2 | 3/2016 | Rued et al. | |
| 9,422,063 B2 | 8/2016 | Diaz | |
| 9,429,072 B2 | 8/2016 | Diaz et al. | |
| 9,759,130 B2 * | 9/2017 | Appukuttan | F02C 7/141 |
| 9,856,793 B2 | 1/2018 | Zelesky et al. | |
| 10,100,739 B2 * | 10/2018 | Kupratis | F02C 7/185 |
| 2003/0046938 A1 | 3/2003 | Mortzheim et al. | |
| 2004/0088995 A1 | 5/2004 | Reissig | |
| 2005/0172612 A1 | 8/2005 | Yamanaka et al. | |
| 2007/0022735 A1 | 2/2007 | Henry et al. | |
| 2007/0213917 A1 | 9/2007 | Bruno et al. | |
| 2007/0245738 A1 | 10/2007 | Stretton et al. | |
| 2008/0028763 A1 | 2/2008 | Schwarz et al. | |
| 2008/0230651 A1 | 9/2008 | Porte | |
| 2008/0253881 A1 | 10/2008 | Richards | |
| 2009/0007567 A1 | 1/2009 | Porte et al. | |
| 2009/0090096 A1 | 4/2009 | Sheridan | |
| 2009/0145102 A1 | 6/2009 | Roberge et al. | |
| 2009/0196736 A1 | 8/2009 | Sengar et al. | |
| 2009/0226297 A1 | 9/2009 | Yanagi et al. | |
| 2009/0272120 A1 | 11/2009 | Tiemann | |
| 2009/0285680 A1 * | 11/2009 | Hess | F01D 5/087 416/1 |
| 2010/0043396 A1 | 2/2010 | Coffinberry | |
| 2010/0154434 A1 | 6/2010 | Kubota et al. | |
| 2011/0036066 A1 | 2/2011 | Zhang et al. | |
| 2011/0088405 A1 | 4/2011 | Turco | |
| 2011/0120083 A1 | 5/2011 | Giffin et al. | |
| 2011/0247344 A1 | 10/2011 | Glahn et al. | |
| 2012/0067055 A1 | 3/2012 | Held | |
| 2012/0102915 A1 | 5/2012 | Baltas | |
| 2012/0159961 A1 | 6/2012 | Krautheim et al. | |
| 2012/0159966 A1 * | 6/2012 | Suciu | F01D 25/18 60/802 |
| 2012/0180509 A1 | 7/2012 | DeFrancesco | |
| 2013/0000317 A1 | 1/2013 | Berryann et al. | |
| 2013/0036747 A1 | 2/2013 | Fuchs et al. | |
| 2013/0067928 A1 | 3/2013 | Arias Chao et al. | |
| 2013/0098059 A1 | 4/2013 | Suciu et al. | |
| 2013/0145744 A1 | 6/2013 | Lo et al. | |
| 2013/0145774 A1 | 6/2013 | Duong et al. | |
| 2013/0186102 A1 | 7/2013 | Lo | |
| 2013/0187007 A1 * | 7/2013 | Mackin | F02C 9/18 244/134 R |
| 2013/0199156 A1 | 8/2013 | Ress, Jr. et al. | |
| 2013/0202406 A1 | 8/2013 | Papa et al. | |
| 2013/0239583 A1 | 9/2013 | Suciu et al. | |
| 2013/0319002 A1 | 12/2013 | Sidelkovskiy et al. | |
| 2014/0020506 A1 | 1/2014 | Duong | |
| 2014/0090395 A1 * | 4/2014 | Appukuttan | F02C 7/141 60/776 |
| 2014/0137417 A1 | 5/2014 | Silberberg et al. | |
| 2014/0196469 A1 | 7/2014 | Finney et al. | |
| 2014/0230444 A1 | 8/2014 | Hao et al. | |
| 2014/0250898 A1 | 9/2014 | Mackin et al. | |
| 2014/0260326 A1 | 9/2014 | Schwarz et al. | |
| 2014/0311157 A1 | 10/2014 | Laurello et al. | |
| 2014/0341704 A1 | 11/2014 | Fletcher | |
| 2014/0352315 A1 | 12/2014 | Diaz | |
| 2015/0114611 A1 | 4/2015 | Morris et al. | |
| 2015/0285147 A1 | 10/2015 | Phillips et al. | |
| 2015/0308339 A1 | 10/2015 | Forcier | |
| 2015/0330236 A1 | 11/2015 | Beecroft et al. | |
| 2015/0354465 A1 | 12/2015 | Suciu et al. | |

(56) References Cited

U.S. PATENT DOCUMENTS

| | | |
|---|---|---|
| 2015/0354822 A1 | 12/2015 | Suciu et al. |
| 2016/0010554 A1 | 1/2016 | Suciu et al. |
| 2016/0131036 A1 | 5/2016 | Bintz et al. |
| 2016/0131037 A1 | 5/2016 | Spangler et al. |
| 2016/0146024 A1* | 5/2016 | Morris ............... B23K 31/02 416/96 R |
| 2016/0160994 A1* | 6/2016 | Venter ............... F16H 57/029 74/606 R |
| 2016/0169118 A1 | 6/2016 | Duong |
| 2016/0215732 A1 | 7/2016 | Malecki |
| 2016/0237906 A1 | 8/2016 | Suciu et al. |
| 2016/0312797 A1 | 10/2016 | Suciu et al. |
| 2016/0341125 A1 | 11/2016 | Kraft et al. |
| 2016/0369697 A1 | 12/2016 | Schwarz et al. |
| 2017/0009657 A1 | 1/2017 | Schwarz et al. |
| 2017/0044980 A1 | 2/2017 | Duesler et al. |
| 2017/0044982 A1 | 2/2017 | Duesler et al. |
| 2017/0138265 A1* | 5/2017 | Simon-Delgado ........ F02C 7/18 |
| 2017/0152765 A1 | 6/2017 | Uechi et al. |
| 2017/0159568 A1 | 6/2017 | Sennoun et al. |
| 2017/0167388 A1 | 6/2017 | Merry et al. |
| 2017/0175632 A1 | 6/2017 | Hanrahan et al. |
| 2017/0184027 A1 | 6/2017 | Moniz et al. |
| 2017/0204787 A1 | 7/2017 | Duesler et al. |

FOREIGN PATENT DOCUMENTS

| | | |
|---|---|---|
| EP | 0469825 | 2/1992 |
| EP | 0608142 A1 | 7/1994 |
| EP | 0903484 | 3/1999 |
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2865981 | 4/2015 |
| EP | 2942490 | 11/2015 |
| EP | 3085923 | 10/2016 |
| EP | 3085924 | 10/2016 |
| EP | 3121411 | 1/2017 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for European Application No. 16155316.9 completed Jun. 30, 2016.
European Search Report for Application No. 16170021.6 dated Oct. 11, 2016.
European Search Report for Application No. 16174862.9 dated Nov. 7, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.
European Search Report for EP Application No. 17160816.9 dated Jul. 21, 2017.
European Search Report for European Application No. 16180657.5 dated Dec. 16, 2016.
European Search Report for European Application No. 16202876.5 dated Apr. 24, 2017.

* cited by examiner

INTERCOOLED COOLING AIR WITH AUXILIARY COMPRESSOR CONTROL

CROSS-REFERENCE TO RELATED APPLICATIONS

This application is a continuation of U.S. patent application Ser. No. 14/967,446 filed Dec. 14, 2015.

BACKGROUND

This application relates to improvements in providing cooling air from a compressor section to a turbine section in a gas turbine engine.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

It is known to provide cooling air from the compressor to the turbine section to lower the operating temperatures in the turbine section and improve overall engine operation. Typically, air from the high compressor discharge has been tapped, passed through a heat exchanger, which may sit in the bypass duct and then delivered into the turbine section. The air from the downstream most end of the compressor section is at elevated temperatures.

SUMMARY

In a featured embodiment, a gas turbine engine includes a main compressor section with a downstream most location. A turbine section has a high pressure turbine. A tap line connects to tap air from a location upstream of the downstream most location in the main compressor section. The tapped air connects to a heat exchanger and then to a cooling compressor. The cooling compressor compresses air downstream of the heat exchanger, and connects to deliver air into the high pressure turbine. A bypass valve is positioned downstream of the main compressor section, and upstream of the heat exchanger. The bypass valve selectively delivers air directly to the cooling compressor without passing through the heat exchanger under certain conditions.

In another embodiment according to the previous embodiment, the bypass valve is positioned on the tap line, and a separate bypass line connects the tap line to the cooling compressor without passing through the heat exchanger.

In another embodiment according to any of the previous embodiments, the bypass valve completely bypasses the heat exchanger.

In another embodiment according to any of the previous embodiments, the bypass valve may be modulated to control the volume of air delivered through the heat exchanger.

In another embodiment according to any of the previous embodiments, the bypass valve completely bypasses the heat exchanger.

In another embodiment according to any of the previous embodiments, the bypass valve may be modulated to control the volume of air delivered through the heat exchanger.

In another embodiment according to any of the previous embodiments, the bypass valve is positioned by a control to bypass the heat exchanger at relatively low power conditions, including idle.

In another embodiment according to any of the previous embodiments, the bypass valve is positioned by the control to flow all air through the heat exchanger under higher power conditions, including take-off.

In another embodiment according to any of the previous embodiments, the cooling compressor includes a centrifugal compressor impeller.

In another embodiment according to any of the previous embodiments, air temperatures at a downstream-most location of the high pressure compressor are greater than or equal to 1350° F. (732° C.).

In another embodiment according to any of the previous embodiments, the turbine section drives a bull gear, the bull gear further driving an impeller of the cooling compressor.

In another embodiment according to any of the previous embodiments, the bull gear also drives an accessory gearbox.

In another embodiment according to any of the previous embodiments, the cooling compressor includes a centrifugal compressor impeller.

In another embodiment according to any of the previous embodiments, air temperatures at a downstream-most location of the high pressure compressor are greater than or equal to 1350° F. (732° C.).

In another embodiment according to any of the previous embodiments, air temperatures at a downstream-most location of the high pressure compressor are greater than or equal to 1350° F. (732° C.).

In another embodiment according to any of the previous embodiments, the turbine section drives a bull gear, the bull gear further driving an impeller of the cooling compressor.

In another embodiment according to any of the previous embodiments, the bull gear also drives an accessory gearbox.

In another featured embodiment, a gas turbine engine includes a main compressor section with a downstream most location. A turbine section has a high pressure turbine. There is a means to tap air from a location upstream of the downstream most location in the main compressor section. The means cools the tapped air and then compresses the air, and delivering air into the high pressure turbine. There is a means for selectively delivering the tapped air directly to be compressed without being cooled under certain conditions.

In another embodiment according to the previous embodiment, the means to tap includes a heat exchanger and a cooling compressor.

In another embodiment according to any of the previous embodiments, the means for selectively delivering the tapped air includes a bypass valve, a bypass line and a control for the bypass valve.

These and other features may be best understood from the following drawings and specification.

DETAILED DESCRIPTION

Figure 1:
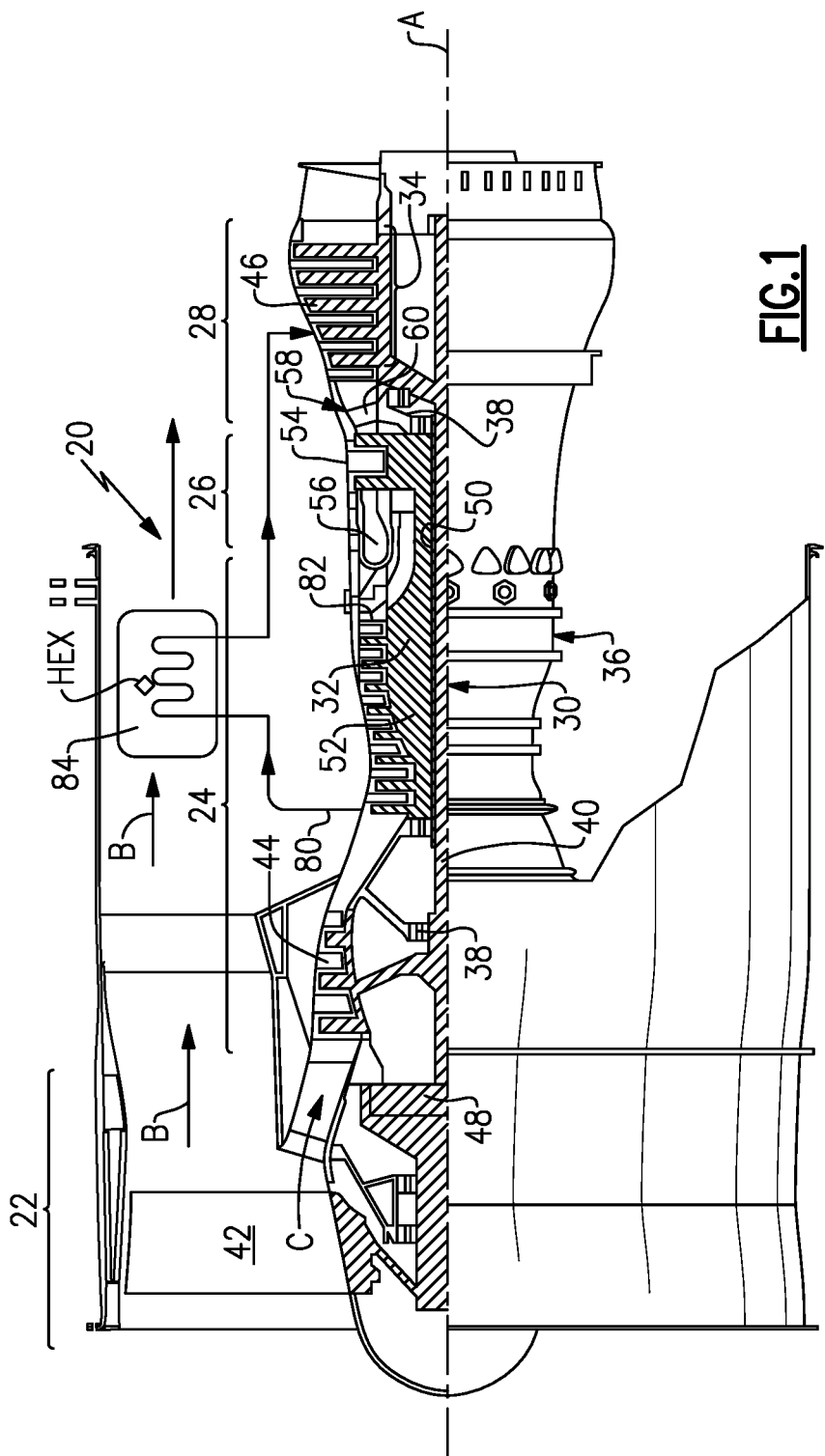
FIG. 1 schematically shows an embodiment of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher overall pressure ratios. By achieving higher overall pressure ratios, increased levels of performance and efficiency may be achieved. However, challenges are raised in that the parts and components associated with a high pressure turbine require additional cooling air as the overall pressure ratio increases.

The example engine 20 utilizes air bleed 80 from an upstream portion of the compressor section 24 for use in cooling portions of the turbine section 28. The air bleed is from a location upstream of the discharge 82 of the compressor section 24. The bleed air passes through a heat exchanger 84 to further cool the cooling air provided to the turbine section 28. The air passing through heat exchanger 84 is cooled by the bypass air B. That is, heat exchanger 84 is positioned in the path of bypass air B.

Figure 2:
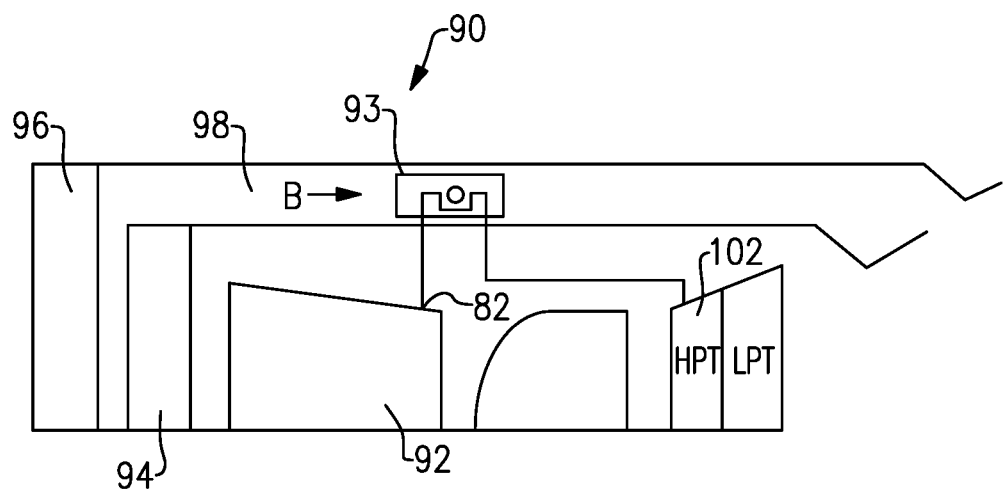
FIG. 2 shows a prior art engine.

A prior art approach to providing cooling air is illustrated in FIG. 2. An engine 90 incorporates a high pressure compressor 92 downstream of the low pressure compressor 94. As known, a fan 96 delivers air into a bypass duct 98 and into the low pressure compressor 94. A downstream most point, or discharge 82 of the high pressure compressor 92 provides bleed air into a heat exchanger 93. The heat exchanger is in the path of the bypass air in bypass duct 98, and is cooled. This high pressure high temperature air from location 82 is delivered into a high pressure turbine 102.

The downstream most point 82 of the high pressure compressor 82 is known as station 3. The temperature T3 and pressure P3 are both very high.

In future engines, T3 levels are expected to approach greater than or equal to 1350° F. (732° C.). Current heat exchanger technology is becoming a limiting factor as they are made of materials, manufacturing, and design capability which have difficulty receiving such high temperature and pressure levels.

Figure 3:
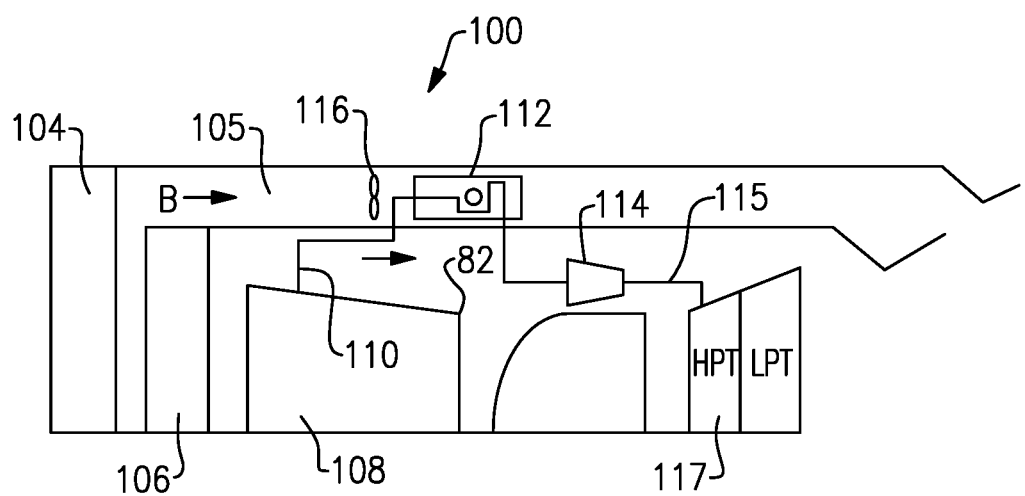
FIG. 3 shows one example engine.

FIG. 3 shows an engine 100 coming within the scope of this disclosure. A fan 104 may deliver air B into a bypass duct 105 and into a low pressure compressor 106. High pressure compressor 108 is positioned downstream of the low pressure compressor 106. A bleed 110 taps air from a location upstream of the downstream most end 82 of the high pressure compressor 108. This air is at temperatures and pressures which are much lower than T3/P3. The air tapped at 110 passes through a heat exchanger 112 which sits in the bypass duct 105 receiving air B. Further, the air from the heat exchanger 112 passes through a compressor 114, and then into a conduit 115 leading to a high turbine 117. This structure is all shown schematically.

Since the air tapped at point 110 is at much lower pressures and temperatures than the FIG. 2 prior art, currently available heat exchanger materials and technology may be utilized. This air is then compressed by compressor 114 to a higher pressure level such that it will be able to flow into the high pressure turbine 117.

An auxiliary fan 116 may be positioned upstream of the heat exchanger 112 as illustrated. The main fan 104 may not provide sufficient pressure to drive sufficient air across the heat exchanger 112. The auxiliary fan will ensure there is adequate air flow in the circumferential location of the heat exchanger 112.

In one embodiment, the auxiliary fan may be variable speed, with the speed of the fan varied to control the temperature of the air downstream of the heat exchanger 112. As an example, the speed of the auxiliary fan may be varied based upon the operating power of the overall engine.

Figure 4:
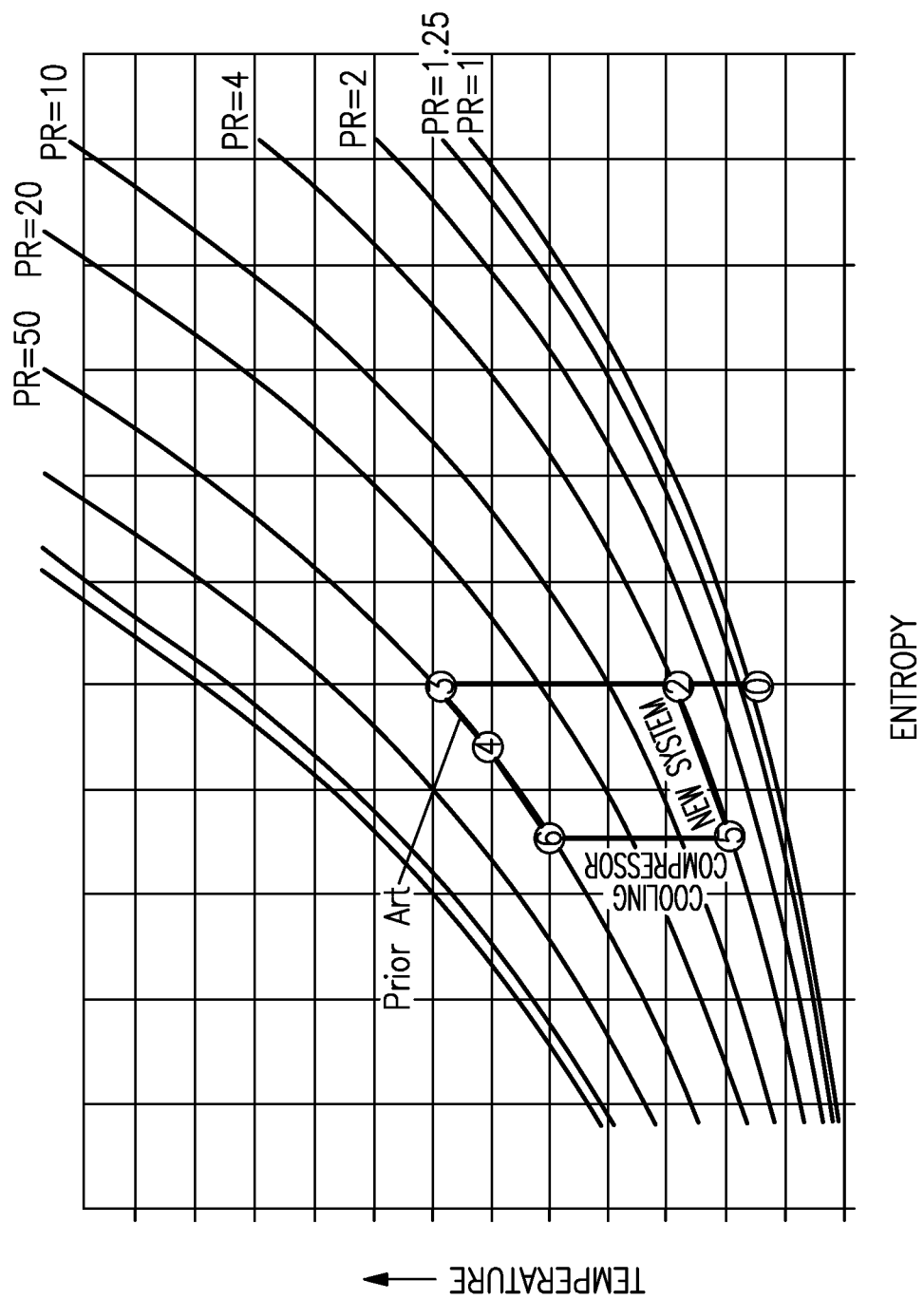
FIG. 4 is a graph illustrating increasing temperatures of a tapped air against the work required.

Referring to FIG. 4, a temperature/entropy diagram illustrates that a lower level of energy is spent to compress air of a lower temperature to the desired P3 pressure level. Cooler air requires less work to compress when compared to warmer air. Accordingly, the work required to raise the pressure of the air drawn from an early stage of the compressor section is less than if the air were compressed to the desired pressure within the compressor section. Therefore, high pressure air at P3 levels or higher can be obtained at significantly lower temperatures than T3. As shown in FIG. 4, to reach a particular pressure ratio, 50 for example, the prior system would move from point 2 to point 3, with a dramatic increase in temperature. However, the disclosed or new system moves from point 2 to point 5 through the heat exchanger, and the cooling compressor then compresses the air up to point 6. As can be appreciated, point 6 is at a much lower temperature.

Figure 5:
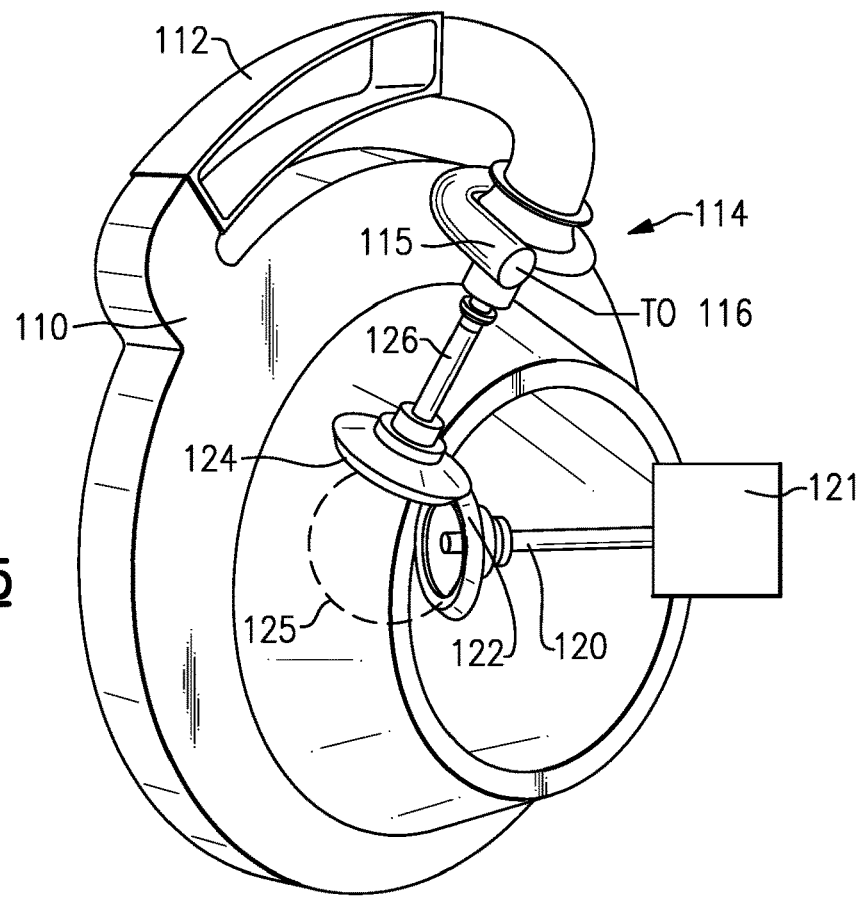
FIG. 5 shows a detail of an example of an engine.

FIG. 5 shows a detail of compressor 114 having an outlet into conduit 115. A primary tower shaft 120 drives an accessory gearbox 121. The shaft 126 drives a compressor rotor within the compressor 114. The shafts 120 and 126 may be driven by a bull gear 125 through respective gears 124 and 126. The bull gear 125 is driven by a turbine rotor, and in one example, with a high pressure compressor rotor.

Figure 6:
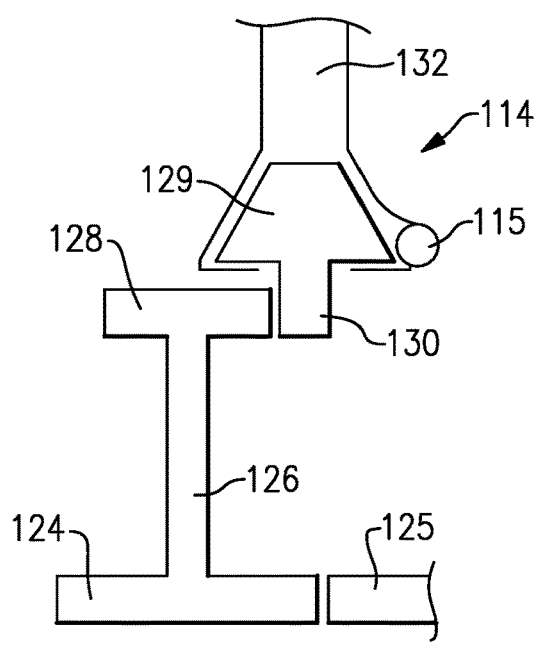
FIG. 6 shows a further detail of the example engine of FIG. 5.

FIG. 6 shows an example wherein a gear 128 is driven by the shaft 126 to, in turn, drive a gear 130 which drives a compressor impeller 129. An input 132 to the compressor impeller 129 supplies the air from the tap 110. The air is compressed and delivered into the outlet conduit 115.

By providing a gear ratio multiplier between the compressor impeller 129 and the high spool bull gear 125, the compressor impeller may be driven to operate an optimum speed. As an example, the gear ratio increase may be in a range of 5:1-8:1, and in one embodiment, 6:1.

Details of the engine, as set forth above, may be found in co-pending U.S. patent application Ser. No. 14/695,578, which is incorporated herein by reference in its entirety.

With the system of FIGS. 1-6, all of the air will be cooled, and thus at low power settings, the turbine disk may be cooler than would be desirable.

Figure 7:
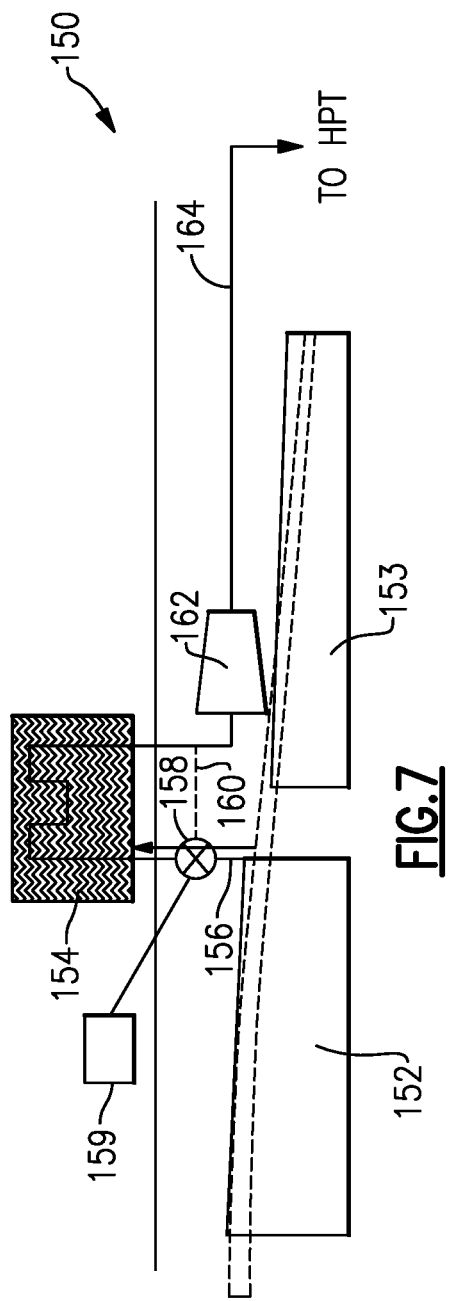
FIG. 7 shows an additional feature.

FIG. 7 shows an embodiment 150 that can be incorporated into any of the foregoing embodiments. In the FIG. 7 embodiment 150, the air is tapped from the low pressure compressor 152, and passed through a heat exchanger 154 from a tap 156, again as in the prior embodiment. A higher pressure compressor 153 may also have the tap at an upstream location. A bypass valve 158 is positioned intermediate the compressor 152 and the heat exchanger 154. The bypass valve 158 selectively bypasses air into a passage 160 leading directly to the cooling compressor 162, and line 164 heading to the high pressure turbine, without passing through the heat exchanger 154. In embodiments, the bypass valve 158 may be capable of completely bypassing all air flow around the heat exchanger 154. In another embodiment, it may be able to modulate the bypassed volume.

Figure 8:
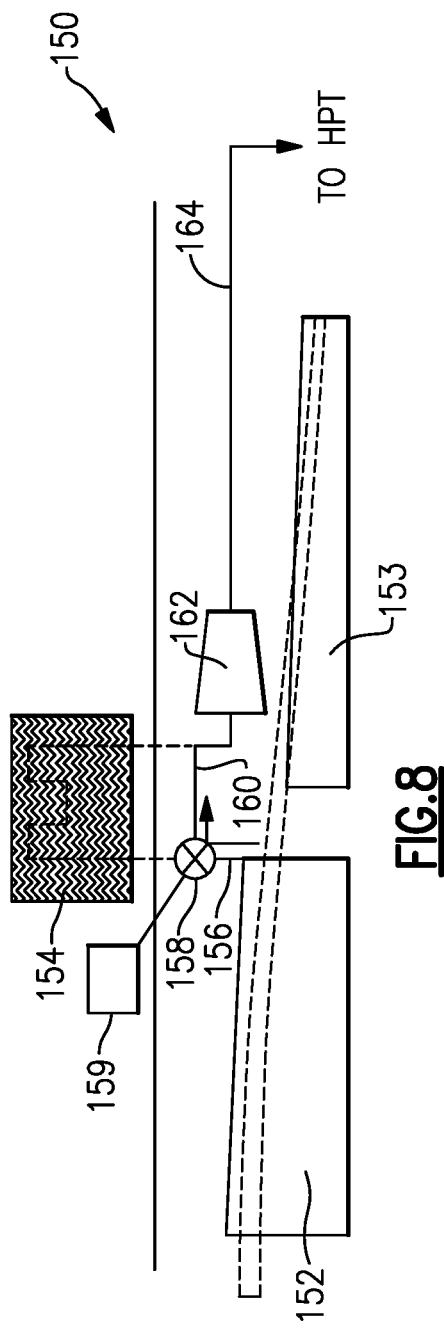
FIG. 8 shows the FIG. 7 system in a distinct position.

In the embodiment 150, and as shown in FIG. 8, at low power settings, the bypass valve 158 may be opened. A control 159 is shown schematically controlling the bypass valve 158. The control 159 may open the bypass valve to deliver air through line 160, and not pass into heat exchanger 154 at low power settings, such as idle or cruise.

On the other hand, at higher power settings, such as take-off and climb, the valve 158 may be positioned in the FIG. 7 position at which the air passes through the heat exchanger 154 for cooling.

A gas turbine engine under this disclosure could be said to include a main compressor section with a downstream most location. A turbine section has a high pressure turbine. There is a means to tap air from a location upstream of the downstream most location in the main compressor section. The means cools the tapped air, then compresses the air, and delivers air into the high pressure turbine. There is a means for selectively delivering the tapped air directly to be compressed without being cooled under certain conditions.

The means to tap includes a heat exchanger and a cooling compressor.

The means for selectively delivering the tapped air includes a bypass valve, a bypass line and a control for the bypass valve.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising;
   a fan for delivering air into a bypass duct and into main compressor section with a downstream most location;
   a turbine section having a high pressure turbine;
   a tap line configured to tap air from a location upstream of said downstream most location in said main compressor section, said tap line connected to a heat exchanger and then to a cooling compressor, said cooling compressor configured to compress air downstream of said heat exchanger, and connected to deliver air into said high pressure turbine;
   a bypass valve positioned downstream of said main compressor section, and upstream of said heat exchanger, wherein said bypass valve is configured to selectively deliver air directly to said cooling compressor without passing through said heat exchanger under certain conditions; and
   wherein said heat exchanger is cooled by air; and
   wherein said turbine section drives a bull gear, said bull gear further driving an impeller of said cooling compressor.

2. The gas turbine engine as set forth in claim 1, wherein said bypass valve is positioned on said tap line, and a separate bypass line connecting said tap line to said cooling compressor without passing through said heat exchanger.

3. The gas turbine engine as set forth in claim 1, wherein said bypass valve completely bypasses said heat exchanger.

4. The gas turbine engine as set forth in claim 1, wherein said bypass valve can be modulated to control the volume of air delivered through the heat exchanger.

5. The gas turbine engine as set forth in claim 1, wherein said bypass valve is positioned by a control to bypass the heat exchanger at relatively low power conditions, including idle.

6. The gas turbine engine as set forth in claim 5, wherein said bypass valve is positioned by said control to flow all air through the heat exchanger under higher power conditions, including take-off.

7. The gas turbine engine as set forth in claim 6, wherein said cooling compressor includes a centrifugal compressor impeller.

8. The gas turbine engine as set forth in claim 1, wherein said cooling compressor includes a centrifugal compressor impeller.

9. The gas turbine engine as set forth in claim 8, wherein air temperatures at the downstream most location of said high pressure compressor are greater than or equal to 1350° F. (732° C.).

10. The gas turbine engine as set forth in claim 1, wherein air temperatures at the downstream most location of said high pressure compressor are greater than or equal to 1350° F. (732° C.).

11. The gas turbine engine as set forth in claim 1, wherein said bull gear also drives an accessory gearbox.

12. The gas turbine engine as set forth in claim 1, wherein said heat exchanger is positioned within said bypass duct, and air delivered by said fan into said bypass duct cools aft from said tap line.

13. The gas turbine engine as set forth in claim 1, wherein said turbine section has a fan drive turbine driving said fan through a gear reduction.

14. A gas turbine engine comprising:
   a fan for delivering air into a bypass duct and into main compressor section with a downstream most location;
   a turbine section having a high pressure turbine;
   a tap line configured to tap air from a location upstream of said downstream most location in said main compressor section, said tap line connected to a heat exchanger and then to a cooling compressor, said cooling compressor configured to compress air downstream of said heat exchanger, and connected to deliver air into said high pressure turbine;
   a bypass valve positioned downstream of said main compressor section, and upstream of said heat exchanger, wherein said bypass valve is configured to selectively deliver air directly to said cooling compressor without passing through said heat exchanger under certain conditions;
   wherein said heat exchanger is cooled by air;
   wherein said bypass valve is positioned by a control to bypass the heat exchanger at relatively low power conditions, including idle
   wherein said bypass valve is positioned by said control to flow all air through the heat exchanger under higher power conditions, including take-off;
   wherein said cooling compressor includes a centrifugal compressor impeller;
   wherein air temperatures at the downstream most location of said high pressure compressor are greater than or equal to 1350° F. (732° C.); and
   wherein said turbine section drives a bull gear, said bull gear further driving of said cooling compressor impeller.

15. The gas turbine engine as set forth in claim 14, wherein said bull gear also drives an accessory gearbox.

16. A gas turbine engine comprising;
   a fan for delivering air into a bypass duct and into a main compressor section with a downstream most location;
   a turbine section having a high pressure turbine;
   a tap line configured to tap air from a location upstream of said downstream most location in said main compressor section, said tap line connected to a heat exchanger and then to a cooling compressor, said cooling compressor configured to compress air downstream of said heat exchanger, and connected to deliver air into said high pressure turbine; and
   a bypass valve positioned downstream of said main compressor section, and upstream of said heat exchanger, wherein said bypass valve is configured to selectively deliver air directly to said cooling compressor without passing through said heat exchanger under certain conditions; and
   said cooling compressor being driven by a tower shaft driven by said turbine section.

17. The gas turbine engine as set forth in claim 16, wherein said tower shaft drives a bull gear, said bull gear further driving said cooling compressor.

18. The gas turbine engine as set forth in claim 17, wherein said bull gear also drives an accessory gearbox.

* * * * *